United States Patent Office 3,357,124
Patented Dec. 12, 1967

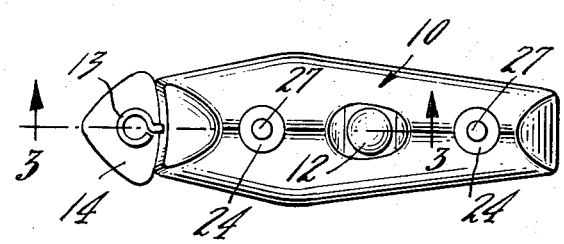
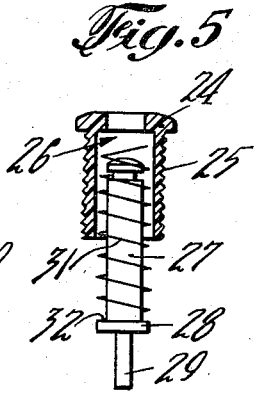
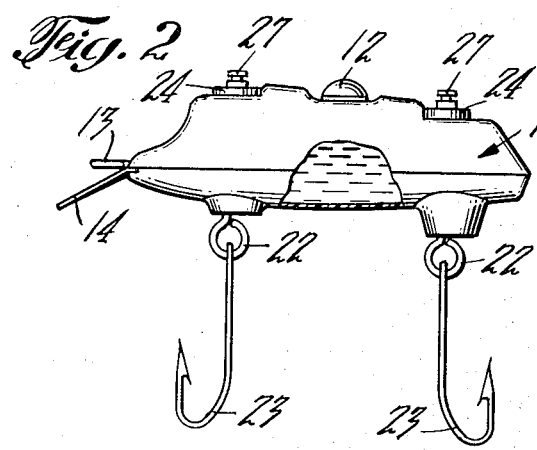
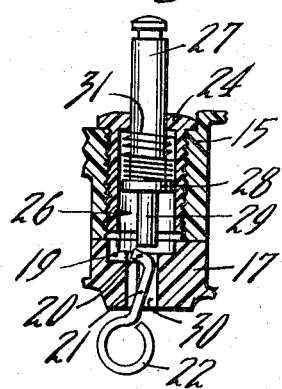
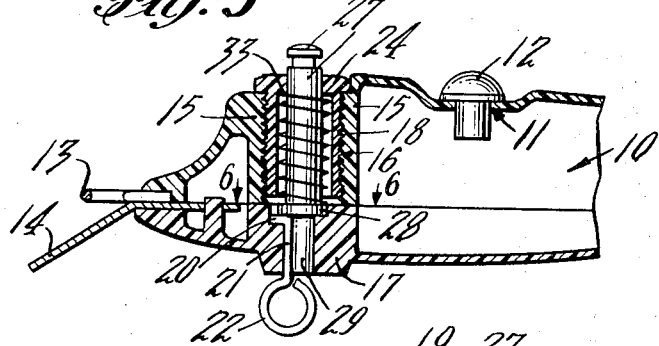
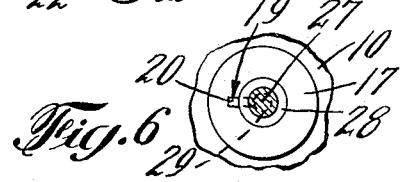

3,357,124
FISHING LURE
David I. Stepacoff, 280 Hobart St., Perth Amboy, N.J.
08861, and Zoltan Klein, 221 Reeves Drive, Beverly
Hills, Calif. 90212
Filed Apr. 26, 1965, Ser. No. 450,721
4 Claims. (Cl. 43—42.09)

ABSTRACT OF THE DISCLOSURE

A hollow fishing lure is provided with a plug so that a desired amount of water can be poured into the body of the lure to make it operable above or below the surface and with a device for releasably holding hook rings with a bent upper portion comprising a well opening at the top and bottom of the lure, the lower portion of the well having a shoulder so that the diameter of the well is less at the lower portion than at the upper portion, a notch in the top surface of the shoulder and a spring biased plunger in the well having a flange which normally bears down on the shoulder and a stem extending below the flange so that the hook can extend through the lower portion of the well along with the stem and have the bent porton resting in the notch below the flange to be selectively held in the lure body.

---

This invention relates to fishing tackle and is more particularly concerned with an improved fishing lure.

It is an object of this invention to provide a lure for fishing which has an improved locking mechanism for holding the hooks, and which can be quickly and easily disassembled for cleaning, repair or replacement.

It is a further object of this invention to provide a lure in which the locking mechanism for holding the hooks can be quickly removed from the body of the lure and replaced by another locking mechanism having similar or different size and types of hooks as may be needed or desired.

It is a still further object of this invention that the hooks may be easily and quickly removed from the locking mechanism without removal of said mechanism from the lure body.

A further object is to provide a lure in which the position of the lure in the water can be varied to provide for the varied conditions as the fishing may require.

For a better understanding of the invention, reference is made to the drawings in which:

FIGURE 1 is a plan view of the lure;

FIGURE 2 is a side elevational view with parts broken away;

FIGURE 3 is an enlarged fragmentary sectional side elevational view on the lines 3—3 of FIGURE 1;

FIGURE 4 is an enlarged fragmentary sectional end view of the detail of FIGURE 3;

FIGURE 5 is a sectional view of a detail; and

FIGURE 6 is a view taken on the line 6—6 of FIGURE 3.

Referring to the drawing, 10 represents the body of the lure, which is preferably of a hard plastic or other waterproof material not affected by either sea or fresh water. The body 10 is hollow and formed generally in the shape of a fish as shown in the drawing, FIGURES 1, 2 and 3. At the top of the body there in an opening 11, closed by a removable rubber or plastic plug 12. The body of the lure is then partially filled with water or other weighting liquid to the desired depth, so that the position of the lure can be controlled or changed to manuever on the surface of the water or underneath the surface of the water as the need of the fishing may require. When the desired amount of liquid has been poured into the lure, the opening 11 is closed by the plug 12.

A towing hook 13 at the front of the body provides means for attaching the towing line to the lure. This hook 13 is fixed in the body of the lure to provide strength to withstand the necessary jerks and tension during the fishing. A fin 14 extends from the front of the lure and below the hook 13 as shown in FIGURES 1, 2 and 3, and this serves as a means for balancing the lure while being towed, and which also causes the lure to dive and dart in movements similar to that of a fish darting in the water. The fin 14 is preferably of sheet steel or other durable metal, which can be shaped as desired to provide for surface or undersurface trolling of the lure.

The body 10 of the lure is provided with one or more wells 15, which are preferably formed in the body of the lure. These wells extend downwardly from an opening 16 in the upper side of the lure body to a shoulder 17 at the lower end of the well. The interior side walls of the well 15 are provided with threads 18 which extend substantially the length of the interior side walls of the wells. The shoulder 17 of the well is cut away to provide a notch 19 into which the right angle shaped upper end 20 of the shaft 21 of the hook ring 22 can be seated. The hook ring 22, which is preferably of strong hardened steel wire, is bent at right angles at its upper end as shown in FIGURES 3 and 4, and the bent portion is adapted to fit into the notch 19 in the shoulder 17. The fish hooks 23 of the lure are hung on the hook ring 22.

A plug 24, preferably of the same material as the body of the lure is provided with exterior threads 25 and adapted to be screwed into the well 15 to provide a tight fit with the body. The plug 24 is preferably of hollow construction to provide a central cavity 26 for the insertion of a plunger 27 in said cavity. The plunger 27 as shown in FIGURES 3 and 4 is longer than the plug 24 and at its lower end has a flange 28 from which extends a stem 29 of a diameter smaller than the flange. The flange 28 is adapted to rest upon the shoulder 17 of the well, and the stem 29 extends downwardly through the hole 30 of said shoulder. The stem 29 is adapted to fit snugly in the hole 30 and against the shaft 21 of the hook ring 22 to hold the latter in place. The flange 28 of the plunger 27 rests against the upper end 20 of the hook ring 22 to prevent movement of the latter, when the plunger 27 is in closed position.

A coil compression spring 31 surrounding the plunger 27 has its lower end 32 bearing against the upper surface of the flange 28, and its upper end 33 bearing against the lower interior surface of the plug 24. Thus, when the plug 24 is screwed into the body 10, the plunger is pushed downwardly into the central cavity 26 so that the stem 29 is in the hole 30 and bearing against the shaft 21 of the hook ring 22, and at the same time, the flange 28 of the plunger 27 bears upon the upper end 20 of the shaft 21 which is seated in the notch 19. The compression spring 31 being in compressed position when the plunger is pushed downwardly holds the flange and the stem in fixed position against the hook ring shaft.

When the plunger 27 has been raised, the flange 28 releases the upper end 20 of the shaft 21 of the hook ring 22 and the stem 29 is raised from hole 30 in the bottom of the well 15 and the hook ring 22 can be taken from the device for cleaning or substitution. In order to assemble, the hook ring shaft 21 is inserted in the hole 30 in the bottom of the body 10 and turned until the right angle upper end 20 of the shaft 21 rests in the notch 19 of the shoulder 17. The plunger 27 being pushed downwardly by the spring 31, is allowed to descend so that the flange 28 presses against the shoulder 17 and the upper end 20 of the shaft to hold the latter firmly in place.

Having described our invention we claim:

1. A fishing lure used in trolling, comprising a watertight hollow body, an opening for introducing a liquid into said body for weighting thereof, means for closing said opening, a well extending into the body of the lure and having internal threads, said well having an opening at the upper portion of the body and a shoulder at the lower portion thereof, said shoulder having a notch therein, a plug having exterior threads adapted to be screwed into said well, a plunger extending downwardly through an opening in said plug and adapted for slidable movement therein, said plunger having a flange at its lower end adapted to bear against said shoulder, a stem extending downwardly from said flange to fit within an opening in said shoulder and the lower portion of said well, a compression spring surrounding said plunger, the lower end of said spring bearing against said flange and the upper end bearing against the lower surface of the top of said plug, a hook ring having an upwardly etxending shaft terminating in a right angle turn and extending up through said opening in the lower end of said well, the right angle turn of said upwardly extending shaft adapted to fit snugly in said notch in the shoulder and said shaft fitting snugly in said opening in said shoulder against the stem of said plunger.

2. A fishing lure used in trolling, comprising a watertight body, said body having a well extending into said body and having openings at the upper and lower ends thereof, a shoulder at the lower end of said well surrounding the opening in the lower end thereof, said shoulder having a notch therein, a removable plug adapted to fit tightly into said well, a plunger extending downwardly through an opening in said plug and adapted for sliding movement therein, said plunger having a flange at its lower end adapted to bear against said shoulder, a stem extending downwardly from said flange to fit within the opening in the lower end of said well, a compression spring surrounding said plunger, the lower end of said spring bearing against said flange and the upper end bearing against the lower surface of the top of said plug, a hook ring having an upwardly extending shaft terminating in a hook at an angle to said shaft extending up through the opening in the lower end of said well, the hook of said upwardly extending shaft being adapted to fit into said notch in the shoulder and said shaft fitting snugly in the lower opening against the stem of said plunger.

3. A fishing lure as set forth in claim 2 wherein said body well and plug are of plastic material.

4. A fishing lure as set forth in claim 2 wherein said body is hollow so that water may be introduced therein for weighting the lure.

References Cited

UNITED STATES PATENTS 3,009,279  11/1961  Jacobson _____ 43—42.09

FOREIGN PATENTS 142,799  11/1953  Sweden.

SAMUEL KOREN, *Primary Examiner.*

D. J. LEACH, *Assistant Examiner.*